United States Patent [19]
Baudu et al.

[11] Patent Number: 5,203,215
[45] Date of Patent: Apr. 20, 1993

[54] MECHANICAL COMPONENT ATTACHMENT SAFETY SYSTEM

[75] Inventors: Pierre A. M. Baudu, Angerville L'Orcher; Jean-Marc D. L. Marescot, Le Havre; Guy B. Vauchel, Le Havre; Pascal-Marie P. M. Soulier, Le Havre, all of France

[73] Assignee: Hispano-Suiza, Saint Cloud, France

[21] Appl. No.: 773,423

[22] Filed: Oct. 9, 1991

[30] Foreign Application Priority Data

Oct. 10, 1990 [FR] France ................................ 90 12478

[51] Int. Cl.[5] ............................................. G05G 5/08
[52] U.S. Cl. .................................... 74/483 R; 49/26; 244/129.4; 292/184
[58] Field of Search ........................ 244/129.4, 129.5; 292/184, DIG. 49; 49/26, 356, 367; 74/483 R, 501.2, 502.4

[56] References Cited

U.S. PATENT DOCUMENTS

| | | | |
|---|---|---|---|
| 631,885 | 8/1899 | Walker | 292/DIG. 49 X |
| 1,532,447 | 4/1925 | Schrader | 292/DIG. 49 X |
| 2,195,542 | 4/1940 | Shaffer et al. | 292/DIG. 49 X |
| 2,261,099 | 10/1941 | Fairbanks | 49/26 X |
| 3,131,892 | 5/1964 | Salmun | 244/129.5 |
| 3,628,817 | 12/1971 | Sheahan et al. | 292/DIG. 49 X |
| 4,142,751 | 3/1979 | Varda | 292/DIG. 49 X |
| 4,375,281 | 3/1983 | Nichols | 244/129.4 X |
| 4,453,684 | 6/1984 | Hanks | 244/129.5 |
| 4,613,099 | 9/1986 | Smith et al. | 244/53 R |

FOREIGN PATENT DOCUMENTS

2077042  12/1981  United Kingdom ............. 74/483 R

*Primary Examiner*—Allan D. Herrmann
*Attorney, Agent, or Firm*—Bacon & Thomas

[57] ABSTRACT

A mechanical component attachment safety system is disclosed wherein a position of a blocking rod is controlled by an over-center lever assembly having a drive lever connected to the blocking rod by a cable actuating system and a link rod. Movement of the drive lever between its over-center positions causes the blocking rod to extend or retract, accordingly. When extended, the blocking rod will prevent closure of a cowl or protective panel and when retracted, will permit closure of the panel or cowl. The drive lever is engaged by a fastener attaching a mechanical component to a frame so as to be retained in a position in which the blocking rod is retracted. If the mechanical component is not properly attached, the fastener will not engage the drive lever, which is biased to its opposite over-center position so as to cause the extension of the blocking rod and prevent closure of the panel or cowl.

8 Claims, 4 Drawing Sheets

MECHANICAL COMPONENT ATTACHMENT SAFETY SYSTEM

BACKGROUND OF THE INVENTION

This invention relates to a mechanical component attachment safety system, particularly such as system as it pertains to the attachment of aircraft components.

Many mechanical safety systems are already known for use in aircraft, particularly where it is desired to prevent closure of a protective component, such as a panel or a cowl, until a structural component located inside the protective component is properly connected or attached.

FIG. 1 schematically illustrates a known safety system which comprises a blocking rod 1 connected by a cable device 2 directly to an actuating lever 4. This safety system is attached to a frame 6 which is normally covered or protected by a cowl 5. It is desired to prevent the closure of the cowl 5 if structural component 8 is not properly attached to the frame 6. As illustrated, the component 8 is connected to a frame 6 by a joint 43, which is also connected to an end of actuating lever 4. The actuating lever 4 is pivotally connected to the frame 6 at pivot attachment 42, while the opposite end is connected to the cable 2 at joint 41.

The spring 9 normally biases the actuating lever 4 to the position shown in dashed lines in FIG. 1 when component 8 is removed from the device. When the component 8 is attached to the frame 6, actuating lever 4 is manually pivoted to the position shown in solid lines such that it may engage the attachment 43. The actuating lever 4 will remain in this position as long as the mechanical component 8 is properly attached.

As can be seen, movement of the lever 4 to its attached position will pull on the cable 2 which will, in turn, retract the blocking rod 1 against the bias of spring 9. Such retraction of the blocking rod 1 will enable the cowl 5 to be closed. If the mechanical component 8 is not properly assembled, the actuating lever 4 will return to the position shown in dashed lines in FIG. 1, due to the action of biasing spring 9, which will also extend the blocking rod 1 to prevent the closure of cowl 5.

However, as can be seen in FIG. 1, cowl 5 may be closed when the mechanical component is not properly assembled and the actuating lever 4 is in the position illustrated in dashed lines, by merely pushing blocking rod 1 inwardly so that it retracts sufficiently to allow the closure of cowl 5. When blocking rod 1 is pushed inwardly, the actuating lever 4 can freely pivot about its attachment point 42 regardless of whether or not the structural component 8 itself is properly attached.

SUMMARY OF THE INVENTION

A mechanical component attachment safety system is disclosed wherein a position of a blocking rod is controlled by an over-center lever assembly having a drive lever connected to the blocking rod by a cable actuating system and a link rod. Movement of the drive lever between its over-center positions causes the blocking rod to extend or retract, accordingly. When extended, the blocking rod will prevent closure of a cowl or protective panel and when retracted, will permit closure of the panel or cowl.

The drive lever is engaged by a fastener for attaching the mechanical component to a frame so as to be retained in a position wherein the blocking rod is retracted. If the mechanical component is not properly attached, the fastener will not engage the drive lever, which is biased to its opposite over-center position so as to cause the extension of the blocking rod and prevent closure of the panel or cowl. The over-center positions of the drive lever render it impossible to manually push the blocking rod toward its retracted position if the mechanical component is not properly attached. This prevents the system from being overridden by the manual retraction of the blocking rod as in the prior art devices. A spring device is operatively associated with the drive lever to bias it toward the over-center position wherein the blocking rod is extended. The drive lever may include a tab to facilitate the manual movement of the drive lever about its attachment point so that it may be engaged with the connector for the mechanical component.

DETAILED DESCRIPTION OF THE PREFERRED EMBODIMENT

Figure 1:
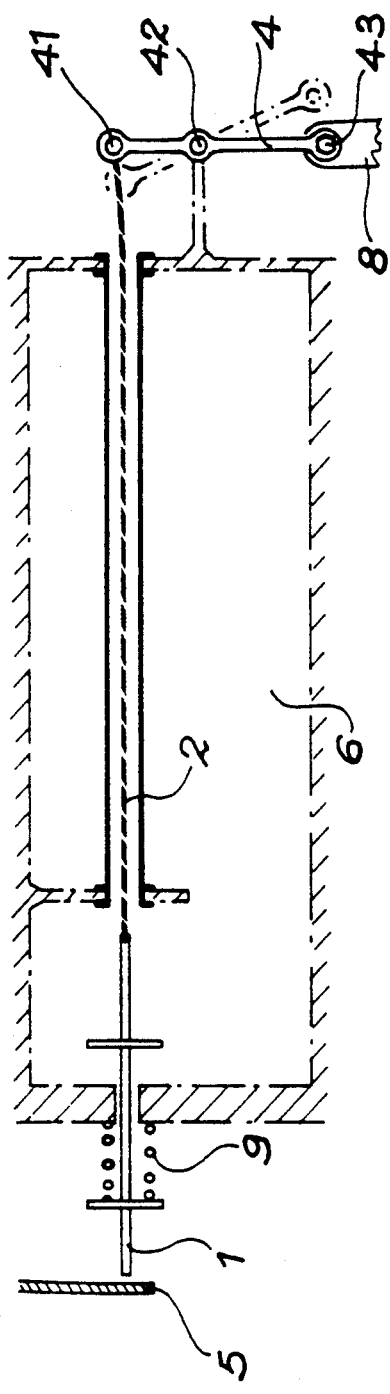
FIG. 1 is a schematic representation of a known mechanical safety system.
Figure 2:
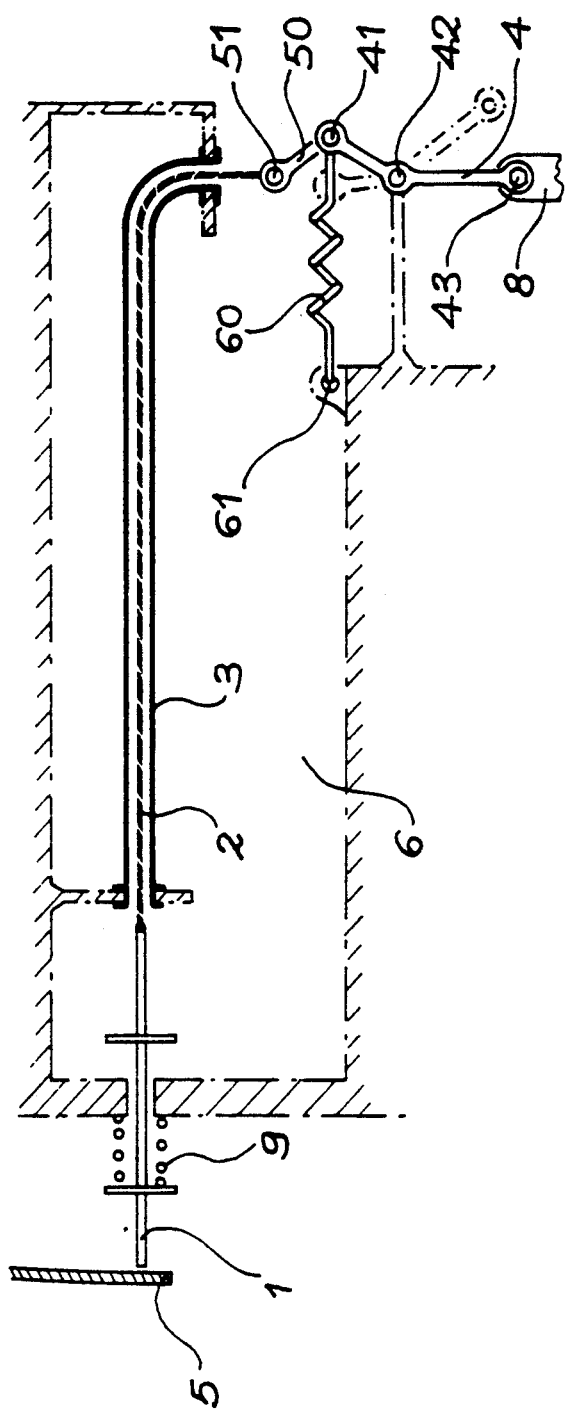
FIG. 2 is a schematic illustration of the mechanical safety system according to the present invention.
Figure 3:
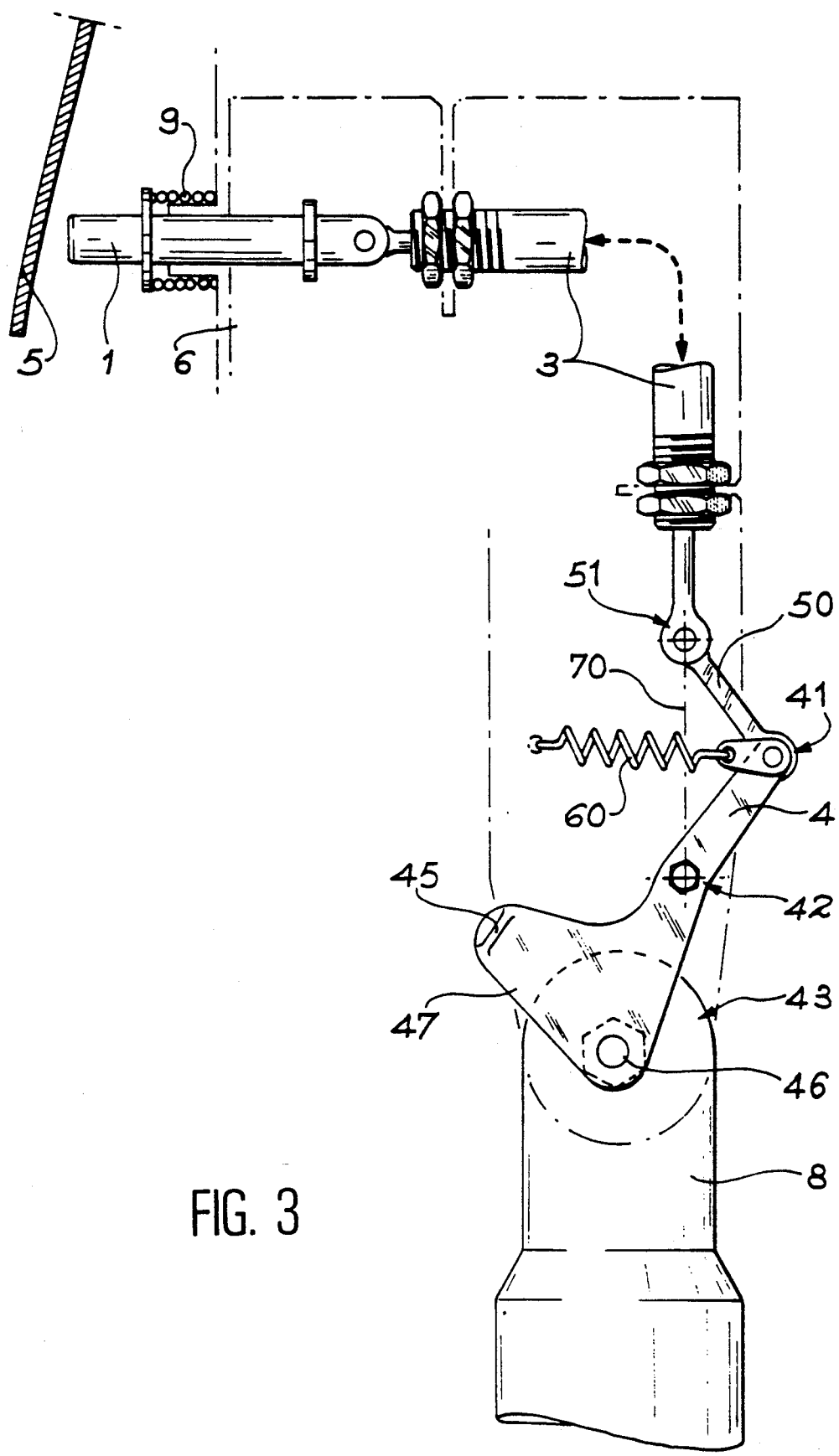
FIG. 3 is a side view of the mechanical safety system according to the present invention showing the over-center lever means in a first position.
Figure 4:
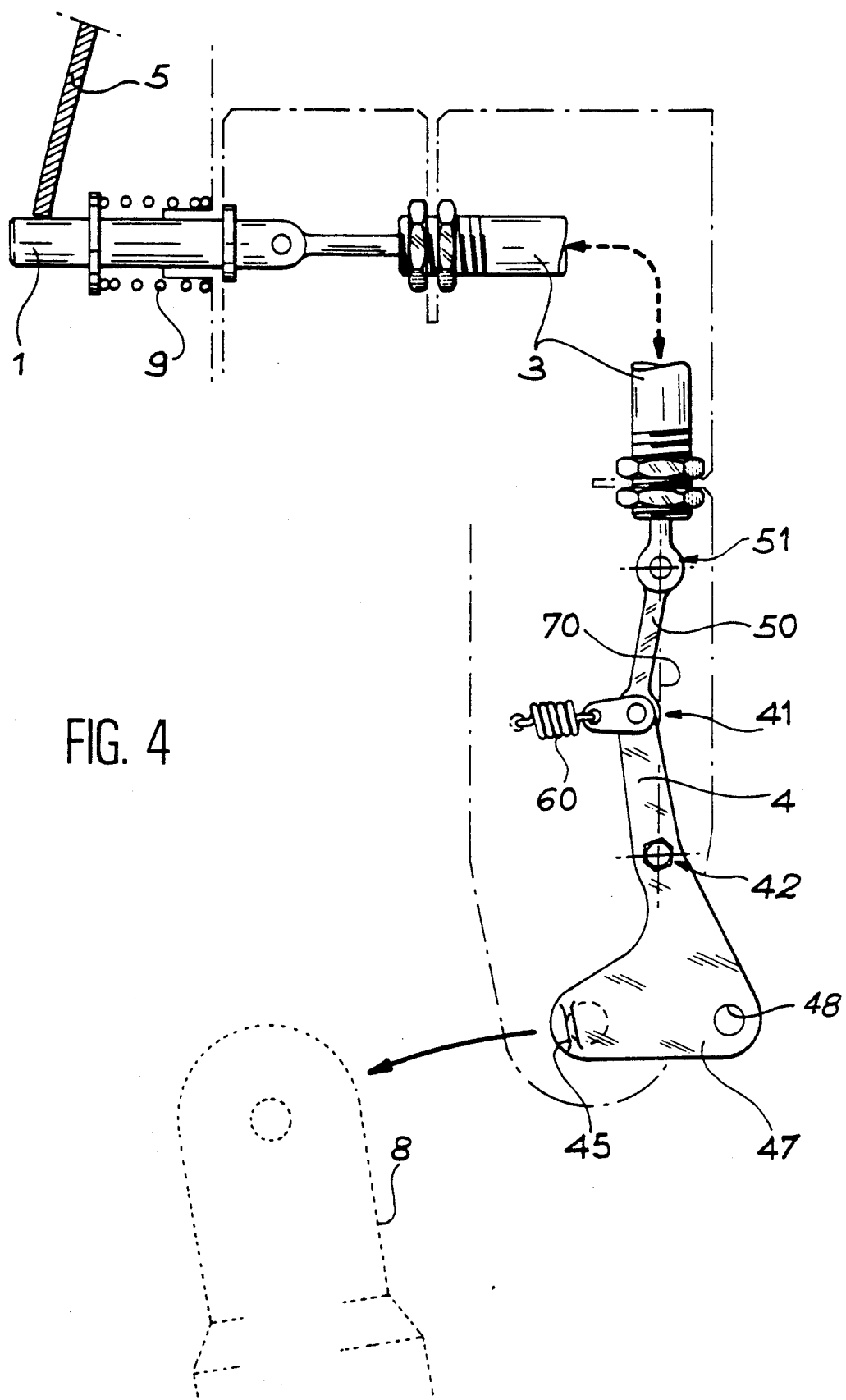
FIG. 4 is a side view similar to FIG. 3, but illustrating the over-center lever means in its second position.
Figure 5:
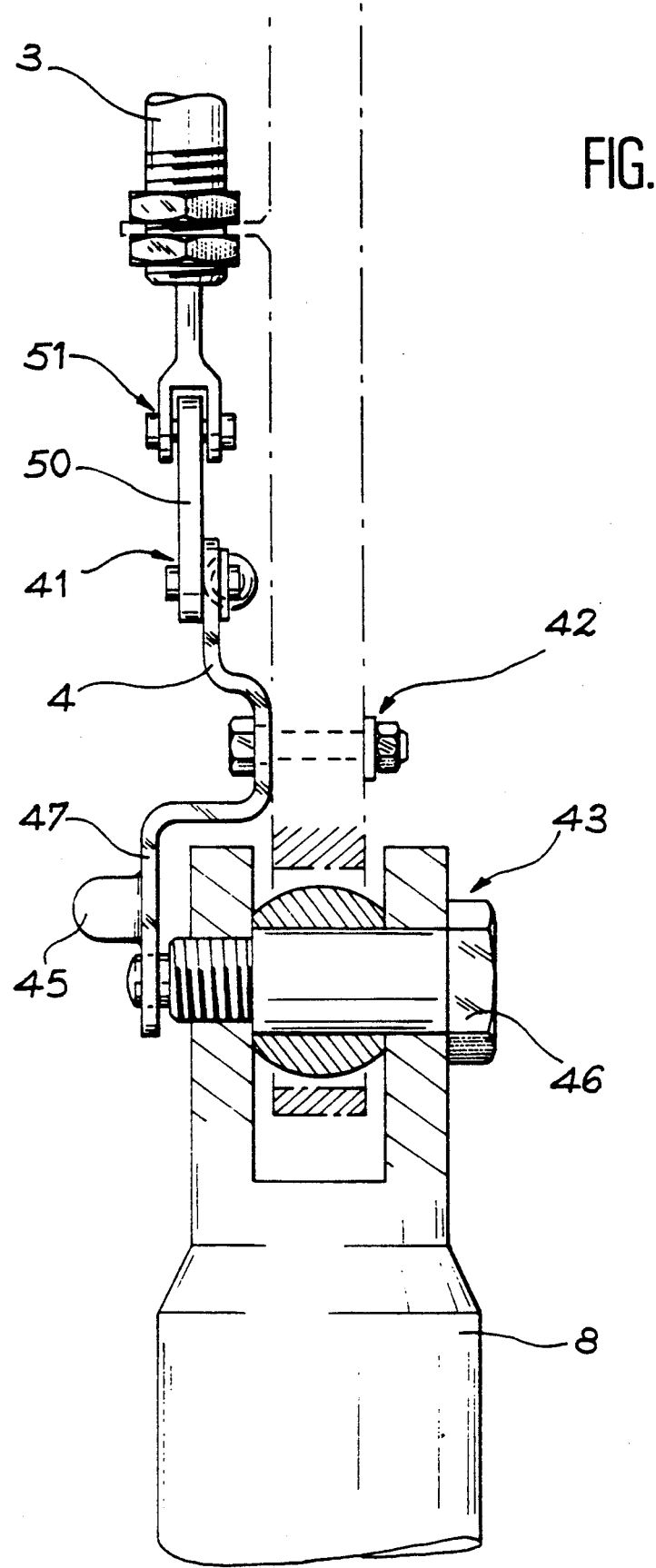
FIG. 5 is a front view of the mechanical safety mechanism illustrated in FIG. 3.

The mechanical component attachment safety system according to the present invention is schematically illustrated in FIG. 2 and a preferred embodiment is illustrated in FIGS. 3-5. Components having a function similar to that of the known system illustrated in FIG. 1 have been assigned the same numerals.

As can be seen in FIG. 2, the mechanical component attachment safety system utilizes a blocking rod 1 that is slidably attached to a frame 6 and movable between an extended position, wherein it prevents the closure of panel or cowl 5, and a retracted position (illustrated in FIG. 2) wherein it permits the panel or cowl 5 to be closed.

A motion transmitting assembly, which may be cable 2 slidably movable inside a sheath 3 connects the blocking rod 1 to a control lever 4 through a link rod 50. Spring 9, which may be a compression spring, is operatively associated with the blocking rod 1 to bias it towards its extended position.

The link rod 50 has a first end connected to drive lever 4 by a pivoting joint 41 and has a second end connected to the cable motion transmitting system by pivot attachment 51.

Drive lever 4 is pivotally attached to the frame 6 by pivot attachment 42. A biasing means, which may comprise a tension spring 60, has a first end attached to the drive lever 4 at the joint 41, while its opposite end is attached to the frame 6 at anchoring point 61. Biasing means 60 normally biases the drive lever 4 in a counter-clockwise direction about pivot attachment 42 to the position indicated in dashed lines in FIG. 2.

Drive lever 4 defines means to engage the fastener for attaching the mechanical component 8 to the frame 6, which may be an opening 48 defined by end portion 47 of the drive lever 4. As illustrated in FIGS. 3 and 5, when the mechanical component 8 is attached to the frame 6 via bolt 46, an end portion of the bolt 46 will extend into the opening 48. This will serve to retain the drive lever 4 in its first position, as illustrated in FIG. 3. In this position, drive lever 4 moves the blocking rod 1 to its retracted position via the link rod 50 and the cable mechanism 2. This enables cowl or panel 5 to be properly closed.

However, should the mechanical component 8 be improperly attached, or not attached at all, spring 60 will urge the drive lever 4 to the position illustrated in FIG. 4, since there is no engagement between the bolt 46 and the opening 48 to prevent such movement. In this position, control lever 4 causes the blocking rod 1 to be extended to its locking position, again through their connection by link rod 50 and cable assembly 2 and 3. Spring 9 also assists in the extension of the blocking rod 1. As can be seen, in this position, the blocking rod 1 prevents closure of the panel or cowl 5.

As can best be seen in FIGS. 3 and 4, the first pivot attachment 42 42, attaching the drive lever 4 to the frame 6, and the second pivot attachment 51 connecting an end of link rod 50 with the cable assembly 3 lie in a common plane 70. This plane is located between the two extreme positions of the pivot connection 41 which interconnects an end of drive lever 4 with an end of link rod 50. In a first position, as illustrated in FIG. 3, this pivot attachment 41 is located on one side of the plane 70, while in its second position, illustrated in FIG. 4, it lies on an opposite side of plane 70.

As can best be seen in FIG. 4, it is not possible to manually push on blocking rod 1 to cause its retraction. Any force exerted on blocking rod 1 while the over-center lever mechanism is in this position will not cause any movement of the lever system. A force exerted on blocking rod 1 will tend to cause the drive lever 4 to pivot about pivot attachment 42 in a counterclockwise direction. Such movement of the control lever beyond the position shown in FIG. 4 is physically not possible due to the connection of the drive lever 4 with the biasing means 60. Thus, any such manual force exerted on blocking rod 1 cannot cause movement of the blocking rod out of its blocking position.

As illlustrated in FIG. 5, the first pivot attachment 42 may comprise a bolt or the like extending through the drive lever 4 and the frame 6. The second pivot attachment 51 may comprise a clevis joint with a rod extending through an end of link rod 50 and the clevis joint formed on the end of the cable 2.

Tab 45 may extend from a portion of drive lever 4 to facilitate the manual movement of the control lever from its position shown in FIG. 4 to the position shown in FIG. 3 such that the bolt 46 may be properly inserted through the mechanical component 8, the frame 6 and into the opening 48.

The foregoing description is provided for illustrative purposes only and should not be construed as in any way limiting this invention, the scope of which is defined solely by the appended claims.

We claim:

1. A mechanical safety system to prevent closing of a cover panel for a mechanical component unless the mechanical component is properly located on a frame comprising:
   a) a blocking rod movable between a first position wherein the blocking rod permits the closing of the cover panel and a second position wherein it prevents closing of the cover panel;
   b) over-center lever means having a plurality of pivot attachment means located in a plane and a joint, the lever means movable between a first position wherein the joint is located on one side of the plane and a second position wherein the joint is located on an opposite side of the plane;
   c) motion transmitting means operatively connecting the blocking rod to the over-center lever means such that when the over center lever means is in its first position the blocking rod is in its first position and when the over-center lever means is in its second position the blocking rod is in its second position;
   d) biasing means operatively associated with the over-center lever means to bias the over-center lever means toward its second position; and,
   e) means to connect the over-center lever means to the mechanical component such that the over-center lever means is retained in its first position when connected to the mechanical component.

2. The mechanical safety system of claim 1 wherein the over-center lever means comprises:
   a) a drive lever having a portion movable between first and second positions;
   b) first pivot attachment means pivotally attaching the drive lever to the frame;
   c) a link rod having a first end portion operatively connected to the drive lever and a second end portion; and,
   d) second pivot attachment means pivotally attaching the second end portion of the link rod to the motion transmitting means, the first and second pivot attachment means lying in a plane extending between the first and second positions of the portion of the drive lever.

3. The mechanical safety device of claim 2 wherein the biasing means comprises a spring operatively associated with the drive lever.

4. The mechanical safety device of claim 2 wherein the spring is a tension spring.

5. The mechanical safety device of claim 1 wherein the motion transmitting means comprises a flexible cable movable inside a sheath and having a first end operatively associated with the blocking rod and a second end operatively associated with the over-center lever means.

6. The mechanical safety device of claim 1 further comprising second biasing means operatively associated with the blocking rod so as to bias the blocking rod toward its second position.

7. The mechanical safety system of claim 2 further comprising manual grip means on the drive lever to facilitate the manual movement of the drive lever to its first position.

8. The mechanical safety system of claim 7 wherein the manual grip means comprises a tab member extending from the drive lever.

* * * * *

UNITED STATES PATENT AND TRADEMARK OFFICE
CERTIFICATE OF CORRECTION

PATENT NO. : 5,203,215

DATED : April 20, 1993

INVENTOR(S) : BAUDU et al.

It is certified that error appears in the above-identified patent and that said Letters Patent is hereby corrected as shown below:

In the Abstract, line 2, change "blcoking" to --blocking--.

Column 3, line 22, delete "42" first occurence.

Signed and Sealed this

Thirtieth Day of November, 1993

BRUCE LEHMAN

Attest:

Attesting Officer

Commissioner of Patents and Trademarks